United States Patent [19]

Stone

[11] Patent Number: 4,668,393
[45] Date of Patent: May 26, 1987

[54] SEMIPERMEABLE BAFFLE FUEL FILTER

[75] Inventor: Walter H. Stone, Modesto, Calif.

[73] Assignee: Parker-Hannifin Corporation, Cleveland, Ohio

[21] Appl. No.: 733,808

[22] Filed: May 14, 1985

[51] Int. Cl.$^4$ .................... B01D 27/04; B01D 27/08
[52] U.S. Cl. .................. 210/304; 210/493.2; 210/493.4; 210/497.1; 55/520
[58] Field of Search .................. 210/304, 314, 416.4, 210/443, 446, 493.4, 497.1, DIG. 5, 494.1, 232, 493.2, ; 55/520

[56] References Cited

U.S. PATENT DOCUMENTS

| | | | |
|---|---|---|---|
| 1,742,743 | 1/1930 | Worbois | 210/454 |
| 1,805,903 | 5/1931 | Bull | 210/446 |
| 1,861,576 | 6/1932 | Liddell | 210/440 |
| 1,951,484 | 3/1934 | Lawes | 210/164 |
| 2,478,109 | 8/1949 | Kamrath | 210/165 |
| 2,507,818 | 5/1950 | Sager | 210/183 |
| 3,280,981 | 11/1966 | Renfrew | 210/197 |
| 3,502,218 | 3/1970 | Tuffnell et al. | 210/305 |
| 4,083,780 | 4/1978 | Call | 210/321.1 |
| 4,241,787 | 12/1980 | Price | 210/500.2 |
| 4,257,890 | 3/1981 | Hurner | 210/112 |
| 4,296,810 | 11/1981 | Price | 210/500.2 |
| 4,425,239 | 1/1984 | Jacocks et al. | 210/521 |
| 4,502,955 | 3/1985 | Schaupp | 210/149 |
| 4,502,956 | 3/1985 | Wilson et al. | 210/248 |

FOREIGN PATENT DOCUMENTS

| | | | |
|---|---|---|---|
| 2047107 | 11/1980 | European Pat. Off. | 210/493.4 |
| 532784 | 9/1931 | Fed. Rep. of Germany . | |
| 708287 | 7/1931 | France . | |
| 7204 | 1/1982 | Japan | 210/493.4 |
| 2115305 | 1/1983 | United Kingdom . | |

Primary Examiner—Richard V. Fisher
Assistant Examiner—Wanda L. Millard
Attorney, Agent, or Firm—Kerkam, Stowell, Kondracki & Clarke

[57] ABSTRACT

A fuel filter has a semipermeable spiral baffle with an open circuitous spiral channel between spiral flights of filter media. Fuel may pass radially (inwardly or outwardly) through the media which preferentially slows water and other contaminants such that the contaminants tend to "settle" in the channel and slowly flow out of the baffle to a contaminant collection zone.

25 Claims, 10 Drawing Figures

SEMIPERMEABLE BAFFLE FUEL FILTER

BACKGROUND OF THE INVENTION

This invention relates to fuel filters and, more particularly, filters for separating water from fuel.

As used herein, "filter" refers to devices used to separate out particulate matter from liquids and also to devices, commonly called "separators", used to separate liquid contaminants out from a desired liquid or liquids. As used herein, "fuel" refers to gasoline, oil, or other liquid fuels.

Previous fuel/water separators or filters can be generally classified in three groups.

A first group does not include filter media, but uses nonpermeable baffles and/or flow directors and low flow settling volumes. These separators are almost totally insensitive (i.e., show no significant pressure differential increase) to particulate contaminants and low temperature fuel waxing. They have relatively indefinite particulate capacities and are characteristically inefficient water and contaminant separators.

A second group of fuel/water separators uses filter media usually containing some type of semipermeable medium that is closed off in such a way that fuel and contaminants must pass through the medium to exit the separator or filter. The separators are characteristically efficient, usually sensitive to particulate and semi-particulate contaminants, and have finite capacities which necessitate filter element changing.

A third general group of fuel/water separators include filter media and some semirestrictive orifice or medium which allows fractional portions of the fuel flow to bypass the most restrictive medium. These bypass filters are usually not full flow in that they filter only a portion of the main fuel stream. Further, if used in a full flow filter, the semirestrictive orifice or medium will not pass the full flow alone without a significant increase in the filter differential pressure. Such an increase may damage or destroy the filter.

In many applications, the inconvenience and cost of filter element clogging and filter element changing is prohibitive. That is, filter elements containing water separators have simply not been used because of the need for changing filter elements after clogging. In these situations, the choice has been made to risk less efficient water separation in order to obtain the benefit of indefinite service life without the need for changing filter elements.

The following patents show various filtering arrangements:

| Patent Number | Inventor | Issue Date |
|---|---|---|
| 1,742,743 | Worbois | Jan. 7, 1930 |
| 1,805,903 | Bull | May 19, 1931 |
| 1,861,576 | Liddell | June 7, 1932 |
| 1,951,484 | Lawes | Mar. 20, 1934 |
| 2,478,109 | Kamrath | Aug. 2, 1949 |
| 3,280,981 | Renfrew | Oct. 25, 1966 |
| 4,083,780 | Call | Apr. 11, 1978 |
| 4,241,787 | Price | Dec. 30, 1980 |
| 4,296,810 | Price | Oct. 27, 1981 |
| 4,425,239 | Jacocks et al. | Jan. 10, 1984 |

The Worbois patent discloses an oil filter which includes spirally arranged fabric walls separated by struts or by spacer sheets with holes.

The Bull patent discloses an oil filter including a spirally arranged filter element having a number of pockets 24. Additionally, the filter may be provided with a bypass valve operative when the filter becomes clogged.

The Liddell patent shows an oil filter which uses a double spiral filter element with a spacing wire helix. The filtered oil passes inward for removal by an outlet.

The Lawes patent discloses a spiral double wall oil filter including rows of stitching providing for a relatively even distribution of matter of the filtering surface. The oil flows into a spiral filter element by way of a feed nipple having holes.

The Kamrath patent discloses an oil filter having a spiral double wall element and filtering by radially inward flow. A contaminant collection zone is disposed at the bottom of the filter, whereas the tip includes a valve arrangement to bypass the filtering element.

The Renfrew patent discloses a filter assembly having a baffle disposed within a filter.

The Call patent discloses a fluid purification system operable by reverse osmosis or ultrafiltration and using a plurality of spiral filtering elements.

The Price patents disclose method and apparatus for separation of oil and water as the oil is pumped from a subsurface formation. A laminated filter element is wound in a coiled arrangement to provide the filtering.

The Jacocks et al. patent shows a coiled arrangement of baffles to separate oil and water. The oil and water passes into the filter housing and proceeds radially inward towards separate outlets which respectively receive the oil and the water. The walls of the baffle coils may include a coating of coalescing material.

Numerous of the above patents use similar closed coil envelope type filters. That is, the liquid is fed in between two walls which extend spirally or in coiled fashion. In order to pass through the filter, the liquid must traverse at least one of the layers of filter media which comprise the walls of the spiral.

OBJECTS AND SUMMARY OF THE INVENTION

Accordingly, it is a primary object of the present invention to provide a new and improved filter.

A more specific object of the present invention is to provide a filter having a water removal efficiency similar to that expected of a filter element containing separator, while offering the service life of a baffle type separator.

A further object of the present invention is to provide a filter wherein a decrease of the permeability of the filtering element will not cause a significant increase in the filter differential pressure.

Yet another object of the present invention is to provide a filter having a full flow bypass in the event of filter element clogging.

A still further object of the present invention is to provide an arrangement wherein separated liquid contaminants may be used to remove solid particulate contaminants from the filter element.

The above and other objects of the present invention which will become more apparent as the description proceeds are realized by an invention comprising a fuel filter having a first fuel zone, a second fuel zone, and a semipermeable baffle; the baffle having a plurality of overlapping layers of filter media each layer spaced by at least a thickness of one of the layers from any adjacent layers to define a circuitous settling channel. The channel proceeds from the first fuel zone to the second fuel zone and is open to allow contaminants to flow from the first fuel zone to the second fuel zone without passage through the layers of filter media. The semipermeable baffle is further operable to allow fuel to flow from the first fuel zone to the second fuel zone by passage through one or more of the layers of filter media such that the filter media preferentially slows contaminants to settle in the channel for movement along the channel. The baffle is spiral with two opposite ends and the layers are spirally extending flights. One of the first and second fuel zones is an interior fuel zone disposed within the baffle and the other of the first and second fuel zones is an exterior fuel zone which is annular and disposed around the baffle. The fuel filter further comprises upper and lower end caps made of impermeable material disposed at the opposite ends of the baffle to define upper and lower sealed boundaries of the channel. The invention further comprises a filter housing having a top and a bottom and a head assembly with a fuel inlet and fuel outlet, the head assembly mounted at the top of the filter housing, and wherein the fuel filter is mounted within the filter housing. The exterior fuel zone extends between the fuel filter and the filter housing and offsets even an outermost point of the filter media from the filter housing. The invention further comprises a collection bowl removably attached at the bottom of the filter housing to receive contaminants separated from fuel by the baffle. The invention is operable with radially inward fuel flow through the baffle and operable with radially outward fuel flow through the baffle. The contaminant collection bowl includes an interior contaminant collection zone to receive contaminants from the interior fuel zone and a separate exterior contaminant collection zone to receive contaminants from the exterior fuel zone.

The invention may alternately be described as comprising a fuel filter having a first fuel zone, a second fuel zone, and a semipermeable baffle, the baffle having a plurality of overlapping layers of filter media, each layer spaced from any adjacent layers to define a circuitous settling channel, the channel proceeding from the first fuel zone to the second fuel zone and being open to allow contaminants to flow from the first fuel zone to the second fuel zone without passage through any of the layers of filter media, the semipermeable baffle operable to allow fuel to flow from the first fuel zone to the second fuel zone by passage through one or more of the layers of filter media such that the filter media preferentially slows contaminants to settle in the channel for movement along the channel, and wherein the baffle is spiral with two opposite ends and the layers are spirally extending flights. A fuel inlet and fuel outlet are operable to respectively feed fuel into and out of the filter housing from above. The invention further comprises at least a first contaminant collection zone disposed below the baffle. The first contaminant collection zone is located in a collection bowl removably attached at the bottom of the filter housing, the first contaminant collection zone disposed to receive contaminants passing between the lower end cap and a lower portion of a side wall of the filter housing. The fuel filter is a cartridge unit removably mounted in the filter housing. The upper end cap has an upper fuel port hole above the interior fuel zone. The lower end cap has a lower contaminant exit hole below the interior fuel zone. The lower end cap includes an annular central mating means operable for mating with a contaminant collection bowl. Each of the layers is spaced by at least the thickness of one of the layers from any adjacent layers.

BRIEF DESCRIPTION OF THE DRAWINGS

The above and other features of the present invention will be more readily understood when the description is considered in conjunction with the accompanying drawings wherein like characters represent like parts throughout the several views and in which.

DETAILED DESCRIPTION

Figure 1:
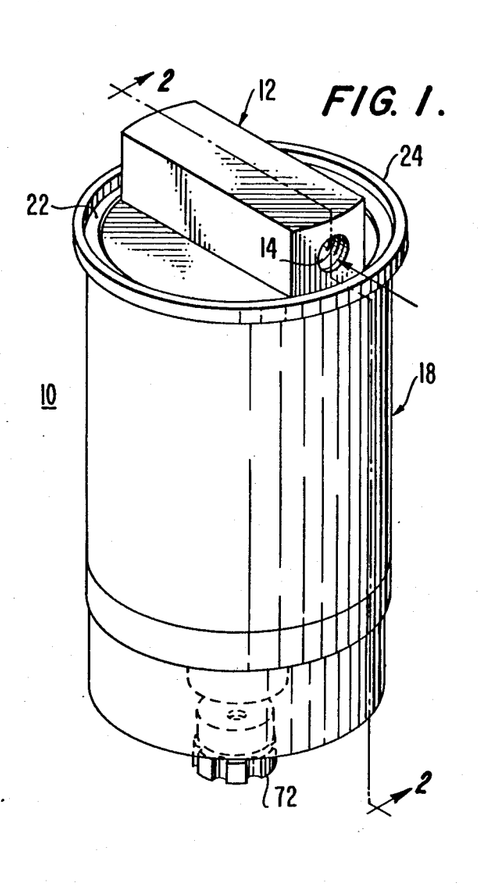
FIG. 1 shows a perspective view of an embodiment of the present invention.

With reference now to the perspective view of FIG. 1 and the cross-section view of FIG. 2, a filter assembly 10 of the present invention will be described. The filter assembly 10 includes a head assembly 12 including a fuel inlet 14 and a fuel outlet 16, each of which is threaded as shown to facilitate hose connections. The head assembly 12, which is preferably die cast or molded synthetic plastic is attached at the top of a filter housing 18. In particular, the head assembly 12 is trapped between an inwardly extending annular bead or ridge 20 and a radially inwardly extending flange 22. As apparent from the drawing, the housing 18 includes an upper ridge 24 caused by doubling over of the layer of material (preferably metal) used for the housing 18. From the annular bead 20, the layer extends up to a U-shaped turn and extends radially outward and immediately downward and is locked in a lockseam which extends upward and over the doubled over portion to the inwardly extending flange 22. Disposed between the flanges 22 and the head assembly 12 is an annular sealing gasket 26.

Figure 2:
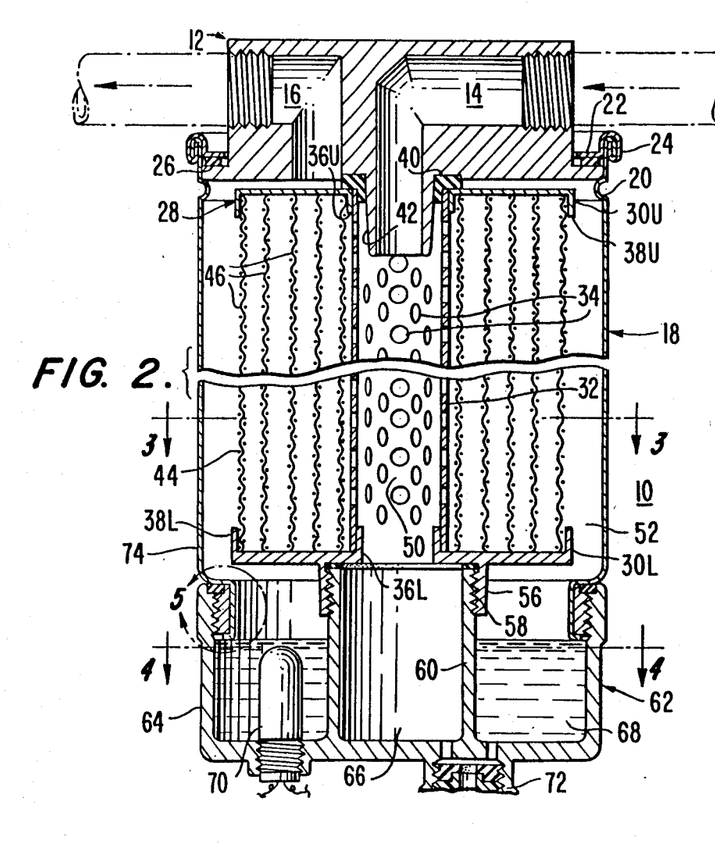
FIG. 2 shows a cross-section view taken along lines 2—2 of FIG. 1.
Figure 3:
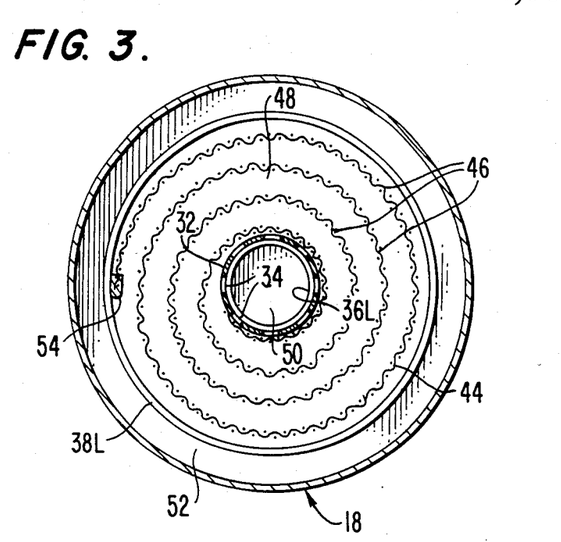
FIG. 3 shows a cross-section view taken along lines 3—3 of FIG. 2.
Figure 4:
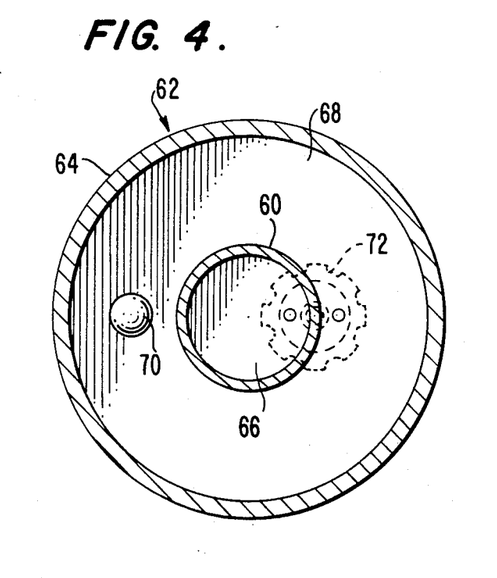
FIG. 4 shows a cross-section view taken along lines 4—4 of FIG. 2.

With reference to FIG. 2 and the cross-section view of FIG. 3 taken along lines 3—3 of FIG. 2, the cartridge-type fuel filter 28 disposed within the filter housing 18 will be described. The filter 28 includes an upper end cap 30U and a lower end cap 30L, each of which is made of liquid impermeable material such as metal or plastic. Extending between the end caps 30U and 30L is a hollow connecting cylinder 32 including a large number of circular holes 34 extending 360° around the cylinder and substantially along its length. As shown, the cylinder 32 is adhered or otherwise attached to an inner upwardly projecting circular ridge 36L on the lower end cap 30L. Additionally, the cylinder 32 is adhered or otherwise attached to an inner downwardly extending circular ridge 36U on the upper end cap 30U. As shown, each of the end caps 30U and 30L includes outer circular ridges 38U and 38L. Mounted on the top end cap 30U is a circular gasket 40 which prevents fuel from bypassing the filter 28. Additionally, the gasket 40, made of rubber or other elastomeric material, may optionally be used to lock the filter 28 onto a downwardly extending tube 42 from the head assembly 12. Although not shown in the drawing, the tube 42 may optionally include a recessed diameter portion adjacent its top such that the resilience of the gasket 40 will tend to hold the filter 28 in the proper position relative to tube 42.

Extending from outside of the cylinder 32 and the inner circular ridges 36U and 36L is a baffle 44 comprising a plurality of flights 46, each flight being a layer of semipermeable filter media. As best shown in FIG. 3, the filter media of the baffle 44 extend out in a spiral to define the filter media flights 46 and to define a circuitous open channel 48 extending out from a first, interior, centrally located fuel zone 50 to a second, annular, exterior fuel zone 52 disposed between the filter housing 18 and the outermost part of the baffle 44. As shown, the distance between adjacent layers or flights 46 is greater than the thickness of any of the layers or flights. As shown by FIGS. 2 and 3, each layer 46 of the baffle is spaced from each adjacent layer throughout its extent, meaning that there is no contact of one layer to another layer or flight throughout the height, width, length, and radius of the layer. Although the baffle 44 may be secured at its interior to a part of the cylinder 32, it is important that at least some of the holes 34 communicate freely with the channel 48 such that fuel may flow from the interior zone 50 by way of the circuitous spiral channel 48 to the exterior fuel zone 52 without passage through the semipermeable layers or flights 46. Instead of being attached to a portion of cylinder 32, the inner most part of the baffle 44 could alternately be radially offset from the cylinder 32. In either case, the cylinder 32 is used to provide structural ridgity to the combination of the baffle 44 and the end caps 30U and 30L. Depending upon the filter medium used for baffle 44, the layers or flights 46 might provide sufficient structural support without the necessity of including a metallic or plastic connecting cylinder 32.

The filter media used for the layers or flights 46 of baffle 44 may be a metal screen, fabric, synthetic coated metal screen, metal coated synthetic screen, synthetic screen, synthetic fabric (polyester, nylon, polypropylene, Teflon, polyethylene, or other man-made fiber) or non-woven synthetics or natural fibers including air layed or liquid layed materials such as paper or Reemay type materials. Manufacturing convenience would favor the screens, but the non-woven synthetics have better performance in some tests. In the preferred embodiment, the filter media is best suited for separating water from diesel fuel. Lighter fuels such as gasoline and heavier fuels such as oil would require appropriately chosen, possibly different, filter media.

A metallic clip 54 is used as reinforcement at the outermost edge of the baffle 44 and may be secured to the outer circular ridges 38U and 38L.

With reference especially to FIG. 2, it will be noted that the channel 48 is sealed at its upper end by upper end cap 30U and is sealed at its lower end by lower end cap 30L. Accordingly, fuel traveling in either direction between the first and second fuel zones 50 and 52, cannot bypass the baffle 44. This is true because, as shown in FIG. 2, each layer is sealed against the upper and lower end caps. The fuel may proceed along the circuitous channel 48 or/and radially through the semipermeable barrier layers or flights 46 of baffle 44.

As shown in FIG. 2, the lower end cap 30L includes a mating portion 56 having the illustrated threads for mating with threads 58 on an inner circular wall 60 of a contaminant collection bowl 62 also having an outer wall 64, thereby defining a central interior contaminant collection zone 66 and an annular exterior contaminant collection zone 68 which may include a water level sensor 70. Both of the contaminant collection zones 66 and 68 may be drained by the drain 72. Although the particulars of the level sensor 70, drain 72, and other details of the contaminant collection bowl 62 which is preferably made of clear plastic are not a necessary part of the present invention, various details with respect thereto may be gathered from U.S. Pat. No. 4,502,956 issued on Mar. 5, 1985 to Wilson et al. including the present inventor and hereby incorporated by reference. If desired, the collection bowl 62 may include a fuel heating arrangement such as disclosed and claimed in U.S. Pat. No. 4,502,955 issued on Mar. 5, 1985 to Schaupp and hereby incorporated by reference.

Figure 5:
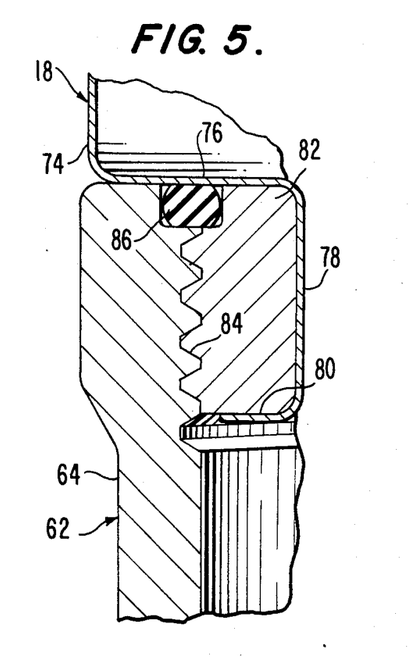
FIG. 5 shows a closeup view of the parts within circle 5 of FIG. 2.

As shown in the detailed view of FIG. 5, the lower portion of side wall 74 of the housing 18 curves inwardly at portion 76, downwardly at portion 78 and outwardly at portion 80 with an annular threaded ring 82 which is trapped between portions 76 and 80. The annular threaded ring 82, which is preferably molded plastic, is threaded to the threads 84 extending around the top of the outer wall 64 of collection bowl 62 and the threaded connection is sealed by an o-ring 86.

With reference now to the cross-section view of FIG. 6, an alternative embodiment of the present invention will be discussed. Those parts of the FIG. 6 embodiment which correspond generally to parts in the embodiment of FIGS. 1–5 will be labeled with the same last two digits in the 100 series, whereas parts of the FIG. 6 embodiment which do not have a similar part in the embodiment of FIGS. 1–5 will be numbered in the 200 series. Emphasis will be placed upon the differences between the embodiment of FIG. 6 and that of FIGS. 1–5.

Figure 6:
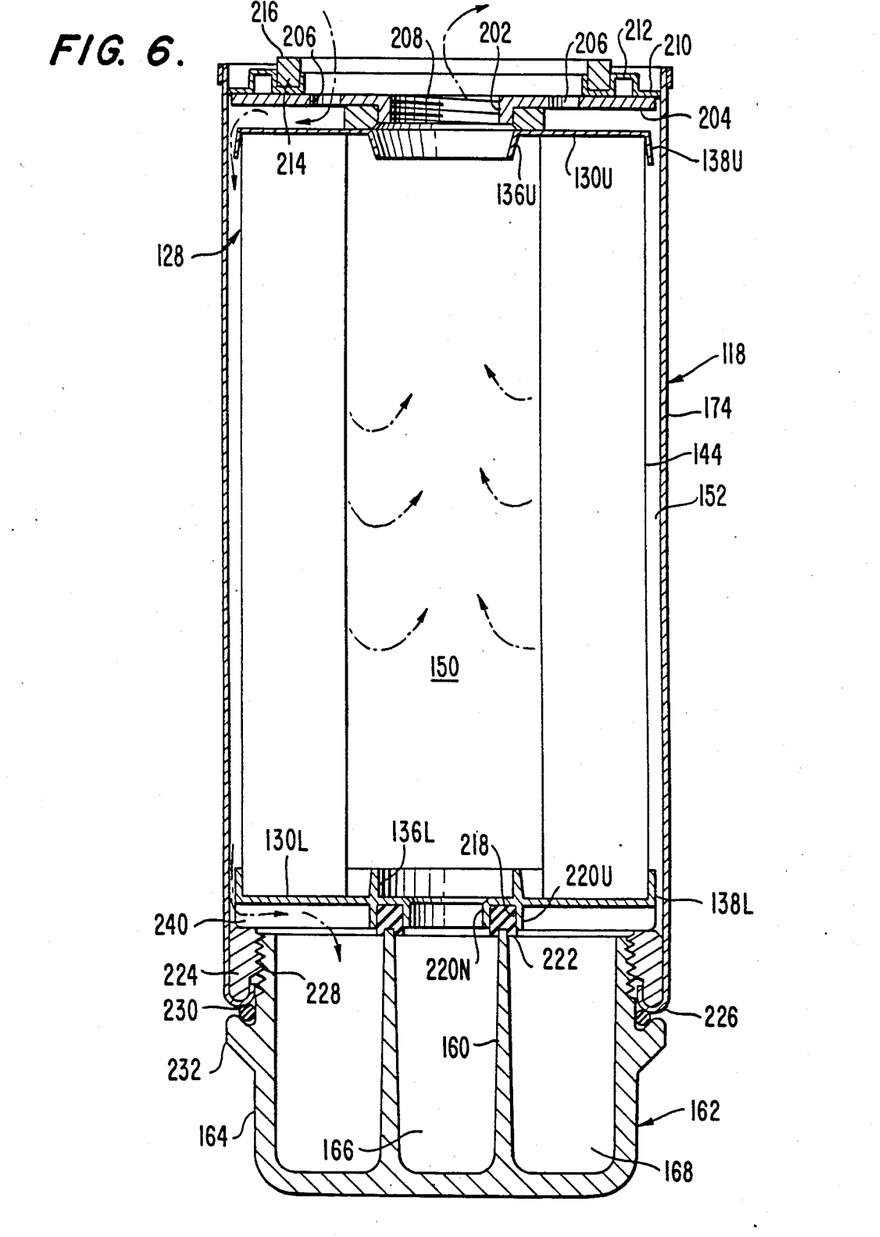
FIG. 6 shows an alternate version of the present invention.

Unlike the arrangement of the first embodiment, the second embodiment shown in FIG. 6 uses a "spin-on" type of filter housing 118 in which baffle 144 is disposed and secured between upper and lower end caps 130U and 130L fixed in position in housing 118. For ease of illustration, baffle 144 is shown in block form only. It will of course be readily understood that the baffle 144 comprises a series of spiral extending flights of layers of filter media extending out from a second fuel zone 150 to a first fuel zone 152 in essentially the same manner as the flights 46 of FIG. 3. The filter 128 of FIG. 6 includes baffle 144, filter housing 118, and the associated parts.

Instead of having a head assembly such as 12 (FIG. 2) permanently mounted to the housing as with the arrangement shown in FIG. 2, the FIG. 6 embodiment includes a central threaded portion 202 to which a separate head assembly (not shown) may be threadably attached. The head assembly may be generally similar to that shown in FIG. 4 of the above-mentioned Wilson U.S. Pat. No. 4,502,956. The threads 202 are within a top piece including a number of fuel entry ports 206 spaced circumferentially around the threads 202, the interior of which constitutes a central fuel exit port 208.

As shown, the cover 210 could be a separate piece welded or otherwise attached within the cylindrically side wall 174. The cover 210 includes an annular ridge 212 and an annular groove 214 in which an annular seal 216 may be mounted. When the head assembly (not shown) is threaded into the threads 202, a seal on the head assembly may separate the central fuel exit port 208 from the plurality of circumferentially arranged fuel entry ports 206. Of course, the fuel could alternately enter through the port 208 within threads 202 and exit by way of the holes 206 in order to realize a radially outward fuel flow instead of the radially inward pattern shown in FIG. 6.

The spiral baffle 144 extends vertically between the end caps 130U and 130L and extends radially within the annular space between upper inner ridge 136U and upper outer ridge 138U and the annular space between lower inner ridge 136L and lower outer ridge 138L.

The bottom of the lower end cap 130L includes an annular groove 218 in between inner and outer circular or annular ridges 220N and 220U respectively. As shown in FIG. 6, the groove 218 together with a seal 222 disposed therein constitutes a mating portion for mating with an inner wall 160 of the contaminant collection bowl 162 which also includes an outer wall 164 such that a central or interior contaminant collection zone 166 is bounded by the cylindrically wall 160, which wall also serves as a boundary for an annular exterior contaminant collection zone 168. Although not shown in the drawing, a level sensor such as sensor 70 of FIG. 2 and a drain such as drain 72 of FIG. 2 would also be included in the contaminant collection bowl 162.

Separate from the end cap 130L is a attachment ring 224 which extends in annular fashion about the lower end of side wall 174 and held securely in place by the inwardly and upwardly turned end 226 of the side wall 174. As shown, the attachment ring 224 includes threads which mate to the threads 228 mounted at the top of the outer wall 164. As the collection bowl 162 is threaded to the attachment ring 224, an o-ring 230 extending around the annular outward projecting ridge 232 is compressed to seal the collection bowl from the external atmosphere. Simultaneously, the inner wall 160 compresses the seal 222 to seal off the inner contaminant collection chamber 166 from the outer contaminant collection chamber or zone 168.

Figure 8:
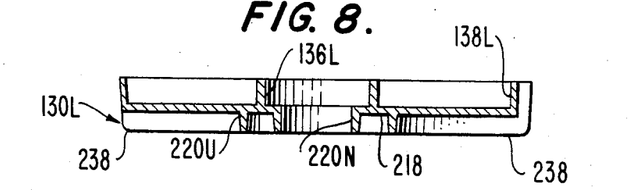
FIG. 8 shows a cross-section view along lines 8—8 of FIG. 7.
Figure 9:
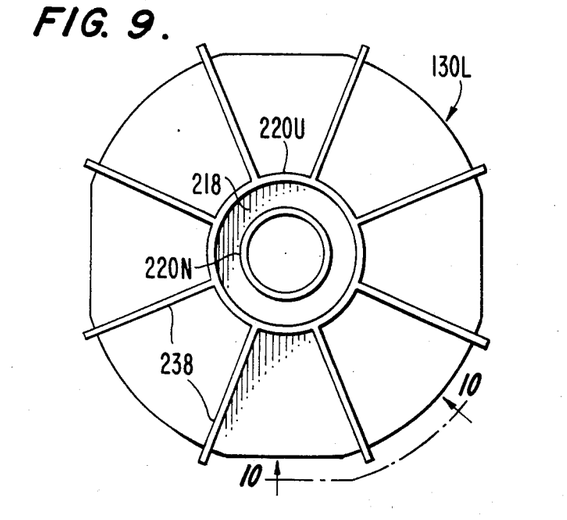
FIG. 9 shows a bottom view of an end cap.
Figure 10:
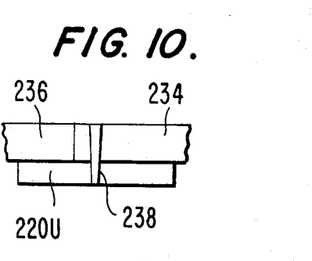
FIG. 10 shows a view along lines 10—10 of FIG. 9.

With reference now to the top view of FIG. 7, cross-section view of FIG. 8, bottom view of FIG. 9, and side detail view of FIG. 10, the end cap 130L will be discussed in detail.

Figure 7:
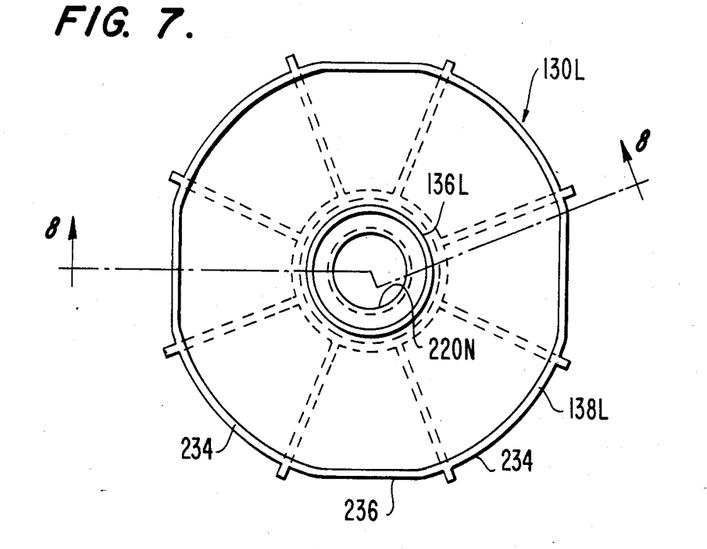
FIG. 7 shows a lower end cap as may be used with the present invention.

As best seen in FIG. 7, the outer ridge 138L deviates from a perfect cylinder. Specifically, it alternates between circularly curved segments 234 and straight edge segments 236. The bottom of the lower end cap 130L includes a plurality of radial ridges 238 extending outwardly from the outer lower annular ridge 220U and extending beyond the edge of the segments 234, as best shown in the right side of FIG. 8 and in FIG. 9.

The radial ridges 238 center the lower end cap 130L within the filter housing 118 while allowing contaminants to flow between the alternating segments 234, 236 and the inside surface of side wall 174. Thus, with reference to FIG. 6, contaminants can flow in the path noted by arrow 240 in order to drop into the outer contaminant collection zone 168. Additionally, water or other contaminants which have been slowed sufficiently by the baffle filter 144 will drop out of the fuel zone 150 through the contaminant outlet within the ridges 220N and fall into the center or interior contaminant collection zone 166.

As the principals of operation of the FIG. 6-10 embodiment are essentially similar to that of the embodiment shown in FIGS. 1-5, the operation will be discussed with reference to FIGS. 2 and 3 in particular. It should also be noted that either of the embodiments may be used for radially inward or radially outward flow.

Fuel enters to within the connecting cylinder 32 by way of the tube 42. Heavy contaminants may drop out of the fuel by passage through the contaminant outlet within the circular ridge 36L. The fuel and remainder of the contaminants pass through the holes 34, thus leaving the interior fuel zone 50 and traveling towards the exterior fuel zone 52. As the fuel passes radially outward, the barrier action of the filter media spiral flight 46 preferentially slows the contaminants, while allowing the fuel to maintain a relatively higher speed. As will be readily appreciated, the fuel flow in the radially outward direction includes fuel flow into one side (i.e., the radially inward side) and out an opposite side (i.e., the radially outward side) of the layers of filter media. As the contaminants drop out of the fuel proceeding radially outward, they fall to the bottom of the spiral channel 48 where they settle and take the long circuitous route to the outside of the baffle 44. Once outside the baffle 44, the contaminants have slowed significantly relative to the fuel and the contaminants drop from the zone 52 through the contaminant outlet between the end cap 30L and the inner surface of side wall 74. As the contaminants drop into the exterior annular contaminant collection zone 68, the fuel has generally kept up its higher speed and may freely pass out of the fuel outlet 16 disposed above the baffle filter 44.

The spiral baffle arrangement made of semipermeable material allows efficient liquid and solid contaminant separation, while leaving an unrestricted pathway for fuel flow. Thus, there can be a full fuel flow bypass of the filter media without significant flow restriction if the permeability of the filter media decreases. Although failure to change the filter may reduce the effectiveness of the separation of water and other contaminants, it will not cut off the fuel flow. Further, the configuration is particularly resistant to clogging because there is always the fully open unrestricted route or passage to the outside of the baffle. An additional advantage is that separated liquid contaminants slowed by passage through the filter media will drop into the channel 48 and help remove settled solid particulates from the interstitial spaces. The liquid contaminants will help carry the solid particulate contaminants along the circuitous channel 48 to the outside of baffle 44 whereupon the liquid and solid contaminants may drop into the contaminant collection bowl 62. The arrangement offers a water removal efficiency comparable to a totally closed filter element, while maintaining the long service life offered by a filterless baffle type of water separator.

Although various specific instructions and details have been described herein, it is to be understood that these are for illustrative purposes only. Various modifications and adaptations will be readily apparent to those of skill in the art. Accordingly, the scope of the present invention should be determined by reference to the claims appended hereto.

What is claimed is:

1. An invention comprising a fuel filter having a first fuel zone, a second fuel zone, and a semipermeable baffle; said baffle having a plurality of overlapping layers of filter media, each layer spaced by at least the thickness of one of the layers from any adjacent layers to define a circuitous settling channel, each layer having two opposite sides, said channel proceeding from said first fuel zone to said second fuel zone and being open to allow contaminants to flow from said first fuel zone to said second fuel zone without passage through any of said layers of filter media, said semipermeable baffle operable to allow fuel to flow from said first fuel zone to said second fuel zone by passage into one side and out an opposite side of one or more of said layers of filter media such that said filter media preferentially slows contaminants to settle in said channel for movement along said channel, and wherein said fuel filter further comprises upper and lower end caps made of impermeable material disposed at said opposite ends of said baffle to define upper and lower sealed boundaries of said channel, each layer being sealed to said upper and lower end caps.

2. The invention of claim 1 wherein said baffle is sprial with two opposite ends and said layers are spirally extending flights.

3. The invention of claim 2 wherein one of first and second fuel zones is an interior fuel zone disposed within said baffle and the other of said first and second fuel zones is an exterior fuel zone which is annular and disposed around said baffle.

4. The invention of claim 3 further comprising a filter housing having a top and a bottom and a head assembly with a fuel inlet and a fuel outlet, said head assembly mounted at the top of said filter housing, and wherein said fuel filter is mounted within said filter housing, said exterior fuel zone extends between said fuel filter and said filter housing and offsets even an outermost point of said filter media from said filter housing.

5. The invention of claim 4 further comprising a collection bowl removably attached at the bottom of said filter housing to receive contaminants separated from fuel by said baffle.

6. The invention of claim 5 wherein said invention is operable with radially inward fuel flow through said baffle and operable with radially outward fuel flow through said baffle.

7. The invention of claim 5 wherein said contaminant collection bowl includes an interior contaminant collection zone to receive contaminants from said interior fuel zone and a separate exterior contaminant collection zone to receive contaminants from said exterior fuel zone.

8. The invention of claim 1 wherein one of first and second fuel zones is an interior fuel zone disposed within said baffle and the other of said first and second fuel zones is an exterior fuel zone which is annular and disposed around said baffle.

9. The invention of claim 8 wherein said lower end cap has a lower contaminant exit hole below said interior fuel zone.

10. The invention of claim 9 wherein said upper end cap has an upper fuel port hole above said interior fuel zone.

11. The invention of claim 8 further comprising a filter housing having a top and a bottom and a head assembly with a fuel inlet and fuel outlet, said head assembly mounted at the top of said filter housing, and wherein said fuel filter is mounted within said filter housing, said exterior fuel zone extends between said fuel filter and said filter housing and offsets even an outermost point of said filter media from said filter housing.

12. The invention of claim 8 wherein said baffle allows fuel flow radially between said interior fuel zone and said exterior fuel zone.

13. An invention comprising a fuel filter having a first fuel zone, a second fuel zone, and a semipermeable baffle; said baffle having a plurality of overlapping layers of filter media, each layer spaced from any adjacent layers to define a circuitous settling channel, each layer having two opposite sides, said channel proceeding from said first fuel zone to said second fuel zone and being open to allow contaminants to flow from said first fuel zone to said second fuel zone without passage through any of said layers of filter media, said semipermeable baffle operable to allow fuel to flow from said first fuel zone to said second fuel zone by passage into one side and out an opposite side of one or more of said layers of filter media such that said filter media preferentially slows contaminants to settle in said channel for movement along said channel, and wherein said baffle is spiral with two opposite ends and said layers are spirally extending flights, and wherein said fuel filter further comprises upper and lower end caps made of impermeable material disposed at said opposite ends of said baffle to define upper and lower sealed boundaries of said channel, each layer being sealed to said upper and lower end caps.

14. The invention of claim 12 wherein one of first and second fuel zones is an interior fuel zone disposed within said baffle and the other of said first and second fuel zones is an exterior fuel zone which is annular and disposed around said baffle.

15. The invention of claim 14 wherein said upper end cap has an upper fuel port hole above said interior fuel zone.

16. The invention of claim 15 wherein said lower end cap includes an annular central mating means operable for mating with a contaminant collection bowl.

17. The invention of claim 16 wherein said fuel filter is a cartridge unit removably mounted in said filter housing, and wherein each layer is spaced by at least the thickness of one of the layers from any adjacent layers.

18. The invention of claim 15 wherein said lower end cap has a lower contaminant exit hole below said interior fuel zone.

19. The invention of claim 13 further comprising a filter housing having a top and a bottom and a head assembly with a fuel inlet and a fuel outlet, said head assembly mounted at the top of said filter housing, and wherein said fuel filter is mounted within said filter housing, and wherein said fuel inlet and said fuel outlet are operable to respectively feed fuel into and out of said filter housing from above, and further comprising at least a first contaminant collection zone disposed below said baffle.

20. The invention of claim 19 wherein one of first and second fuel zones is an interior fuel zone disposed within said baffle and the other of said first and second fuel zones is an exterior fuel zone which is annular and disposed around said baffle.

21. The invention of claim 20 wherein said first contaminant collection zone is located in a collection bowl removably attached at the bottom of said filter housing, said first contaminant collection zone disposed to receive contaminants passing between said lower end cap and a lower portion of a side wall of said filter housing.

22. The invention of claim 21 wherein said fuel filter is a cartridge unit removably mounted in said filter housing.

23. The invention of claim 13 further comprising a filter housing and wherein said baffle is fixed in position relative to said filter housing.

24. An invention comprising a fuel filter having a first fuel zone, a second fuel zone, and a semipermeable baffle; said baffle having a plurality of overlapping layers of filter media, each layer spaced from any adjacent layers throughout the extent of the layer to define a circuitous settling channel, each layer having two opposite sides, said channel proceeding from said first fuel zone to said second fuel zone and being open to allow contaminants to flow from said first fuel zone to said second fuel zone without passage through any of said layers of filter media, said semipermeable baffle operable to allow fuel to flow from said first fuel zone to said second fuel zone by passage into one side and out an opposite side of one or more of said layers of filter media such that said filter media preferentially slows contaminants to settle in said channel for movement along said channel, and wherein said baffle is spiral with two opposite ends and said layers are sprially extending flights.

25. The invention of claim 24 wherein said fuel filter further comprises upper and lower end caps made of impermeable material disposed at said opposite ends of said baffle to define upper and lower sealed boudaries of said channel.

* * * * *

UNITED STATES PATENT AND TRADEMARK OFFICE
CERTIFICATE OF CORRECTION

PATENT NO. : 4,668,393

DATED : May 26, 1987

INVENTOR(S) : Walter H. Stone

It is certified that error appears in the above-identified patent and that said Letters Patent is hereby corrected as shown below:

Column 9, line 17, Claim 2, change "sprial" to --spiral--;

Column 10, line 24, Claim 14, change "12" to --13--;

Column 12, line 6, Claim 24, change "sprially" to --spirally--.

Signed and Sealed this

Twenty-fifth Day of August, 1987

Attest:

DONALD J. QUIGG

Attesting Officer

Commissioner of Patents and Trademarks